Patented Nov. 14, 1944

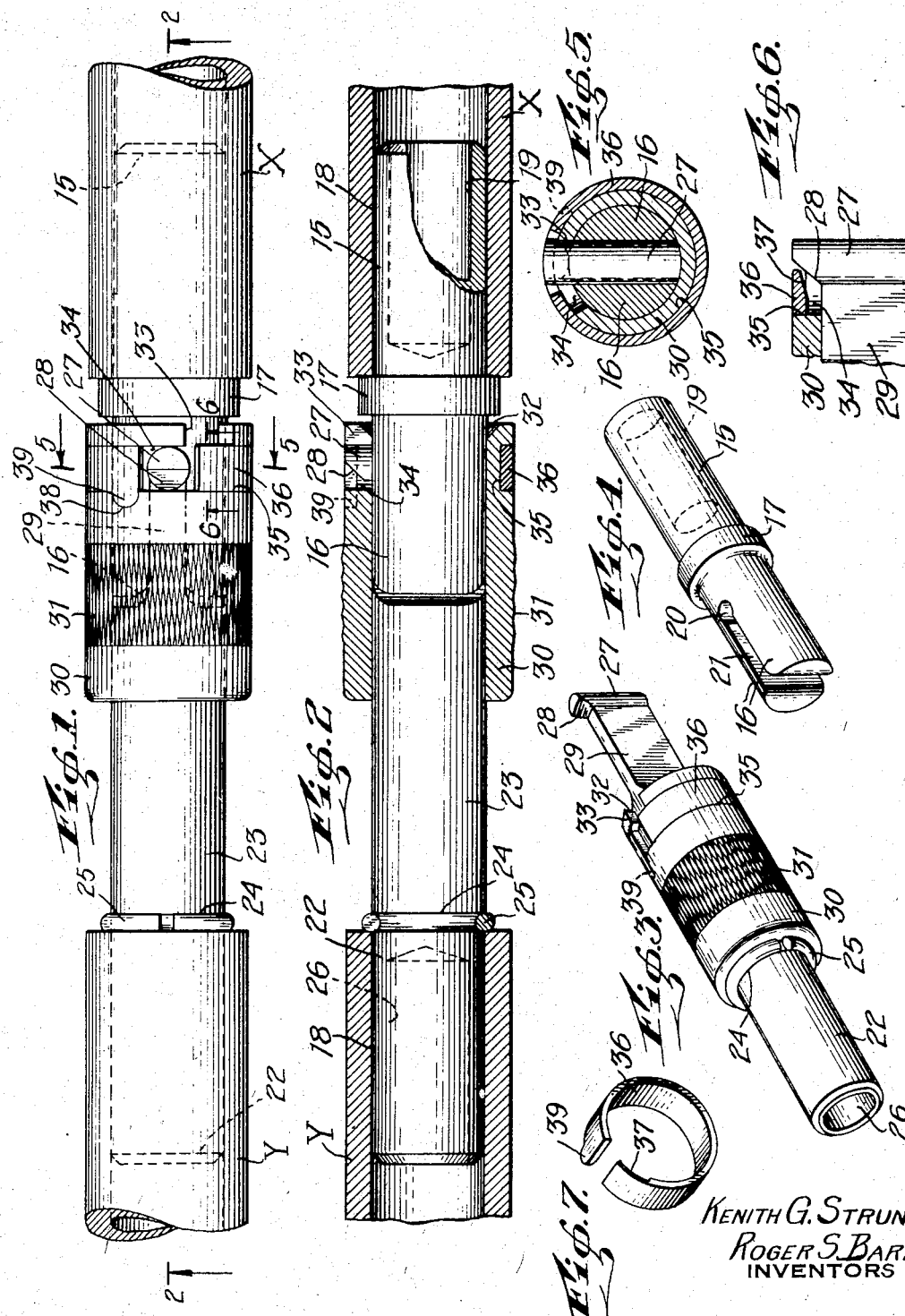

2,362,856

UNITED STATES PATENT OFFICE 2,362,856

COAXIAL COUPLING

Kenith G. Strunk, East Orange, and Roger S. Barr, Denville, N. J., assignors to Breeze Corporations, Inc., Newark, N. J., a corporation of New Jersey Application January 15, 1943, Serial No. 472,530

9 Claims. (Cl. 287—104)

This invention relates to that class of mechanical devices commonly known as couplings, used to connect the ends of two elements, as rods, tubes and similar parts, in axial alinement.

It is known that certain devices for this purpose, even having a similarity in appearance and structure, have been found apt to fail when subjected to the strenuous tests imposed in service.

It is therefore an object of the present invention to provide a coupling that, due to its improved construction, obviates the possibility of failure from jars, shocks, vibrations, alternations in direction of force applied, and other reactionary effects to which it may be subjected.

A further feature is in the provision of a coupling capable of uniting linear parts rapidly and securely, without recourse to extraneous tools and appliances of any kind, transmitting motion, both torsional and longitudinal, from one to the other, with substantially the same force and effect that would exist if the parts were integral, and without lost motion, also stationary braces, stays, etc.

Another purpose is to produce a coupling of non-corrodable material, suited for use under conditions that would be harmful to ferrous alloys, that is substantially indestructible in the performance of its functions, and which occupies only a limited space when in use.

These valuable objects are achieved by the novel and practical construction, combination and arrangement of parts hereinafter described and illustrated in the accompanying drawing, constituting a graphical component of this disclosure, and in which:

Figure 1 is a side view of an embodiment of the invention, shown in assembled, operative position.

Figure 2 is a longitudinal sectional view looking on line 2—2 of Figure 1.

Figure 3 is a perspective view of one of the main members equipped with its movable parts.

Figure 4 is a similar view of the mating member.

Figure 5 is a transverse sectional view taken on line 5—5 of Figure 1.

Figure 6 is a fragmentary partial sectional view looking on line 6—6 of Figure 1, before complete engagement.

Figure 7 is a perspective view of the spring clasp used in the structure.

In order that the invention may be clearly comprehended, attention is directed to the details of the drawing, in which the two parts, shown as tubes, designated by the characters X and Y respectively, are to be coupled, either of which may be the driver or driven.

The tube X, at the right, is fitted to the shank 15 of a stub 16, to contact an integral collar 17 and preferably held in place by a film of silver solder 18 or other adequate means. The shank 15 has an axial bore 19 in its end portion to receive a rod, if such be used in place of a tube, to unite it with the stub.

The stub 16, is preferably of a length exceeding its diameter, and, at a point slightly in front of the collar, is provided with a transverse bore 20, uniform in diameter and extending entirely through the center of the stub.

Leading from the bore 20 outwardly to the extreme end of the stub is through slot 21, its width being approximately equal to half the diameter of the bore, the end edges of the slot being preferably curved as shown.

The tube Y, at the left, is fitted over the shank 22 of a straight cylindrical stub 23, provided with an annular recess 24 to receive a spring ring 25, its periphery being greater than the diameter of the shank and acting in the manner of a removable collar, limiting the position of the tube Y.

The shank 22 contains a bore 26, similar to, and for the same purpose as the bore 19, and is positively secured in the tube Y by a silver solder film 18, or other preferred means.

At the opposite extremity of the stub 23 is formed a substantially cylindrical nib 27 extending transversely outward beyond the diameter of the stub, on one side only, and fitted to slidably engage in the bore 20; the rear edge of the extending portion of the nib is beveled slightly, constituting a cam surface 28.

This nib 27 is integrally connected to the main portion of the stub 23 by a rib 29 having flat parallel sides slidably fitting the slot 21, in the manner of a clevis yoke, and provided with fillets to contact the bifurcated end of the stub 16.

A sleeve 30, movably fitted to the stub 23, is provided with a knurled portion 31 to facilitate maneuvering, and limited in its rearward movement by the ring 25.

The front end of the sleeve 30 has a bevel 32, corresponding to the angle 28 of the nib 27, and leading into the sleeve is a short longitudinal slot 33 extending into a transverse slot 34, these slots being receptive of the nib 27 and forming therewith the well known bayonet joint connection.

A circumferential groove 35, formed in the forward portion of the sleeve, over the slot 34, is closely receptive of a spring clasp 36, provided at the end extending partially over the slot 33, with an under beveled cam surface 37 engageable with the cam 28 of the nib when making connection, the nib, when forced against the beveled surface, causing the clasp 36, in that vicinity, to be momentarily raised by the cammed surfaces, permitting the nib to pass into the slot 34 to become positively locked therein.

A notch 38, leading from the groove 35, receives a lug 39, integral with the opposite end of the clasp 36, preventing the clasp from turning relative to the sleeve at all times.

The material preferred for use in making the coupling is Monel metal, except the spring clasp which is suitably tempered steel, cadmium plated to resist corrosion.

In operation, the sleeve is placed on the stub, the spring ring 25, applied thereafter, which, together with the nib 27 retains it from removal.

When the shanks 15 and 22 are secured to the parts to be coupled, the sleeve 30 is moved against the stop ring, the nib 27 inserted into the bore 26, from either side of the shank 15, until the stub 23 is in axial alinement with the stub 16.

The sleeve 30 is now moved to the right until the end of the nib 27 enters the slot 33, and the beveled cam end portion 28 of the nib engages the under-cut, cam surface 37 of the spring clasp. Pressure on the sleeve 30 causes the free end of the clasp 36 to rise, whereupon by turning the sleeve to the right, the nib enters the short transverse slot 34; the clasp end, then being released, snaps down to act effectually as an abutment in retaining the nib in the slot 34, locking the parts in positive tight engagement, until removed by a very considerable exertion of force applied to the sleeve to spring the clasp upwardly and outwardly, thereby to unlock the nib and permit the sleeve to be moved to the left and uncouple the device.

From the foregoing it will be apparent that a straight line coupling has been disclosed capable of transmitting effectively torsional, tensile, compressive or other stresses, and which is not affected by shocks, jars or vibrations to which it may be subjected, the device being as rigid, unyielding and free from accidental disassociation of parts or looseness of any kind, as if of unitary construction.

Although the foregoing is descriptive of the best known form of the invention, it is subject to such changes and modifications as may come within the purview of the claims hereto appended.

Having thus fully described the invention, what is claimed as new and sought to secure by Letters Patent of the United States is:

1. A co-axial coupling having laterally intersecting end elements capable of one being completely passed laterally through the other, releasable means to retain said elements in engagement, said means including an elongated nib on one element, a sleeve movable on the other element and having a bayonet slot to engage the end portion of said nib, and a spring clasp mounted circumjacently on said sleeve to lock said nib within the bayonet slot when said elements are in engagement.

2. A co-axial coupling comprising two mutually interengageable parts arranged for relative lateral movement in engaging and disengaging, a sleeve movable over said parts when in engagement, said sleeve having a shallow annular recess containing an open slot at the front and a notch in its rear offset from the slot, a split spring band set flush in said recess and having a lug to enter the notch and a pin set in the other part adapted to be passed through said slot and become seated between an end of said band and the end of the slot, whereby said parts are locked together in intimate relation.

3. A co-axial coupling comprising a pair of cylindrical members, one having an open rectangular socket expanded at its inner end, the other member having a tenon enterable from either side into said socket and provided with an end extension engageable in its expanded portion, a sleeve movable on said other member and having a longitudinal slot turned laterally at its inner end receptive of said extension, and a curved split spring clasp set fast in the periphery of said sleeve, one end being free to rise to permit entrance of said extension, whereby to retain it in the lateral portion of the slot.

4. A co-axial coupling comprising, in combination with two shank elements fixedly united with the parts to be coupled, and cylindrical stubs on the adjacent ends of said elements, one of said stubs having a transverse bore therethrough and a slot of lesser width than the diameter of the bore extending therefrom to the outer end of the stub, a cross bar integrally connected with the other stub and engageable in the bore, a sleeve movable on the last named stub, a bayonet joint slot in said sleeve to engage the projecting end of said bar, and a split spring clasp set flush in said sleeve to retain said bar when entered between its ends.

5. A coupling comprising two cylindrical elements, one having a mortise in its end portion terminating in a transverse bore, a tenon on the other element fitting said mortise, a key pin on the extremity of the tenon coincidentally fitting the bore, a sleeve adjustable on the second element to extend outwardly past said pin, said sleeve having a single bayonet slot in its end to engage the pin, a circumferential groove in said sleeve intersecting the inner angular end of the bayonet slot, a split spring clasp fitting said groove, means to prevent rotative movement of said clasp, one of the ends of said clasp being disposed over the longitudinal portion of said bayonet slot to positively lock said pin in its angular end, and combined cam means on said pin and clasp respectively to raise said clasp thereby to release said pin upon the application of force to said sleeve to turn it on said second element.

6. A coupling comprising a pair of stubs, each adapted to be rigidly engaged with one of the parts to be coupled, one of said stubs having an integral collar, a cylindrical extension therebeyond, said extension having a transverse bore and a central longitudinal rabbet slot leading from the end thereto, the other of said stubs being cylindrical and having an annular groove spaced from its outer end, a spring ring set in the groove, the periphery of said ring exceeding in diameter that of the stub, a central flat shackle bolt extending integrally from the inner cylindrical end of the stub snug fitting said rabbet slot, a transverse nib on said bolt fitting the bore in the extension of the first named stub and enterable from either side thereof, a sleeve movable on the inner portion of the second stub and extending to the end thereof, said sleeve having a bayonet joint slot receptive of the nib, and an annular flat bottomed groove in its periphery disposed over the inner angular portion of the slot, a spring cincture set in said groove having an internal laterally cammed end alined with said angular portion of the slot, and means to retain said cincture in fixed position on said sleeve.

7. A coupling for uniting linear elements, comprising a plug having a flattened end portion terminating in a thickened nib extending laterally at one end beyond the cylindrical portion of the plug, said extending portion being beveled at the rear, a socket having means to receive said nib and flattened end, a sleeve freely movable on said plug, means to retain the sleeve thereon, a bayonet slot in said outer end, said sleeve having a circumferential groove, a split spring clasp held in the groove, said clasp partially overlying the bayonet slot and being beveled internally to be raised by the beveled end of said nib when forced thereagainst, and means to prevent relative rotary movement of said clasp and sleeve, said clasp positively preventing the removal of the nib from the bayonet slot.

8. A coupling comprising two cylindrical stubs each having an end firmly fixed to one of the parts to be united, one stub having a transverse passage and a relatively narrow slot leading thereto from its opposite end, a flat stem on the corresponding end of the other stub engageable in said slot, a transverse nib connected by said stem to engage in said passage, one end of said nib extending outwardly therebeyond and having a beveled edge leading to said stem, a sleeve movable on the last named stub over said stem, said sleeve having a circumferential groove and a notch in one of the side walls thereof, a bayonet joint slot in the end of said sleeve passing through said groove receptive of said nib, a curved split spring clasp set in said groove, a lug on said clasp engaged in said notch to prevent relative rotation, one of the ends of said clasp terminating beyond the angular end of said bayonet slot and the other end intersecting the slot, its under side being beveled to engage the nib bevel thereby to release said nib upon the application of force when said sleeve is turned in one direction and to lock the nib within the slot when turned in the opposite direction.

9. A co-axial coupling having laterally intersecting end elements capable of one being completely passed laterally through the other, releasable means to retain said elements in engagement, said means including an elongated nib on one element having a cam surface on the advance end, a sleeve freely movable on the other element, a bayonet joint slot in the advance end of said sleeve to engage the elongated portion of said nib, a curled spring clasp fixed on said sleeve, said clasp having an end disposable partially over said bayonet slot, and a cam surface in said end co-operative with the cam on the nib to be raised in passing said nib into the slot, the end of said clasp preventing retraction of the nib thereafter.

KENITH G. STRUNK.
ROGER S. BARR.